United States Patent [19]
King Solis et al.

[11] Patent Number: 5,879,729
[45] Date of Patent: Mar. 9, 1999

[54] COMPOSITION AND PROCESS USEFUL FOR REDUCING THE FAT CALORIC CONTENT OF FOODSTUFFS CONTAINING FATS AND OILS

[75] Inventors: Luis Roberto King Solis; Laurenz Anton Kistler Hahn, both of Quito, Ecuador

[73] Assignee: Nestec S.A., Vevey, Switzerland

[21] Appl. No.: 871,411

[22] Filed: Jun. 9, 1997

Related U.S. Application Data

[63] Continuation of Ser. No. 366,947, Dec. 29, 1994, abandoned.

[30] Foreign Application Priority Data

Jan. 13, 1994 [EP] European Pat. Off. .............. 94100410

[51] Int. Cl.[6] ................................. A23L 1/12; A23L 1/48
[52] U.S. Cl. ................................. 426/28; 426/18; 426/20; 426/21; 426/31; 426/49; 426/52
[58] Field of Search .................................. 426/18, 20, 21, 426/31, 49, 52, 28

[56] References Cited

U.S. PATENT DOCUMENTS 5,464,639  11/1995  Clyde et al. .............................. 426/20

FOREIGN PATENT DOCUMENTS 0A-2 092 878  8/1982  United Kingdom .
WO-A-91 17672  11/1991  WIPO .

OTHER PUBLICATIONS

Patent Abstract, vol. 12 (176)(C–498), JP 62285771, (Norio Mihara), May 1988.

*Primary Examiner*—Chhaya D. Sayala
*Attorney, Agent, or Firm*—Pennie & Edmonds LLP

[57] ABSTRACT

The fat caloric content of foodstuffs containing fats or oils can be reduced by adding to the foodstuffs an acidic amylaceous fermented composition resulting from a process wherein a) a slurry of cereal flour and at least one additional non-cereal starch material is first subjected to gelatinization and further homogenized;

b) inoculated with an acidifying strain or a mixture of acidifying strains selected from Lactobacillus species, *Streptococcus thermophilus* and Bifidobacterium species;

c) then subjected to a fermentation over a period and at a temperature such as to afford a pH of about 3.5 to 4.6 of the fermented material; and d) finally stabilized.

12 Claims, No Drawings

COMPOSITION AND PROCESS USEFUL FOR REDUCING THE FAT CALORIC CONTENT OF FOODSTUFFS CONTAINING FATS AND OILS

This is a continuation of application Ser. No. 08/366,947, filed Dec. 29, 1994, now abandoned.

TECHNICAL FIELD

The invention relates to a new process for reducing the fat caloric content of food products containing fats or oils.

The invention further relates to a composition useful for reducing the fat caloric content of a wide range of food products containing fats or oils.

The invention finally relates to foodstuffs comprising a composition as defined here above and exhibiting a reduced fat caloric content.

BACKGROUND ART

It is a modern but nevertheless long term trend to try to reduce as much as possible consumers daily diet in terms of fat or lipidic caloric content. As fats and oils still remain necessary for organoleptic purposes such as thickness, smoothness substituting same by some natural equivalent but less caloric food material is not an easy task. Such replacement food materials must prove stable and compatible with the other coingredients, as well as the remaining portion of fats or oils in the concerned foodstuffs.

Thus, despite the many previous attempts which have been proposed in this respect the food industry is still looking for cheap and easy solutions to that problem.

Although lactic fermentation is known since long, its main use is dairy food products. In a few cases, however, lactic fermentation was also applied to non-dairy products such as cereals or cereal based food materials.

WO-A- 91/17672 discloses a food product containing dietary fiber and a method for making same. This method comprises lactic fermentation, based substantially on cereal bran, and leads to a presumed nutritionally beneficial and tasty product which further contains living microorganisms. The method provides more specifically an easy-to-use fiber rich food product including a significant amount of living Lactobacilli. Obviously such a product would not cope with the aim of the invention.

GB-A-2092878 refers to a process for producing African native beer which comprises fermenting a liquid cereal extract to which has been added dairy whey. The resulting beverage, once conveniently sterilized and packed, is then used as such: it is defined as nourishing, non-alcoholic, pleasant tasting, shelf-stable and refreshing.

There is in fact no indication or suggestion that such solid or liquid food products would meet the goals defined hereinabove.

SUMMARY OF THE INVENTION

The present invention provides to the man in the art a new and original means to successfully reduce the fat or lipidic caloric content in various foodstuffs containing significant amounts of fats or oils according to their original recipe. It has been surprisingly discovered that such a goal could be easily and satisfactorily achieved making use of an acidic, cereal based, fermented material as defined hereinbelow.

A first object of the present invention is a process for reducing the fat caloric content of foodstuffs containing fats or oils which comprises adding thereto an acidic amylaceous fermented composition resulting from a process wherein a) a slurry of cereal flour and at least one additional non-cereal starch material is first subjected to gelatinization and further homogenized;

b) inoculated with an acidifying strain or a mixture of acidifying strains selected from Lactobacillus species, Streptococcus thermophilus and Bifidobacterium species;

c) then subjected to a fermentation over a period and at a temperature such as to afford a pH of about 3.5 to 4.6 of the fermented material; and d) finally stabilized.

Another object of the invention is a composition suitable for reducing the fat caloric content of foodstuff containing fats or oils, which consists of an acidic amylaceous fermented composition resulting from a process wherein a) a slurry of cereal flour and at least one additional non-cereal starch material is first subjected to gelatinization and further homogenized;

b) inoculated with an acidifying strain or a mixture of acidifying strains selected from Lactobacillus species, Streptococcus thermophilus and Bifidobacterium species;

c) then subjected to a fermentation over a period and at a temperature such as to afford a pH of about 3.5 to 4.6 of the fermented material: and d) finally stabilized.

Still another object of the invention is a foodstuff comprising a composition as defined here above and exhibiting a reduced fat caloric content when compared to its initial recipe.

DETAILED DESCRIPTION OF THE PREFERRED EMBODIMENTS

According to the invention, as cereal flour subjected to fermentation one can use conveniently rice flour, wheat flour, oat flour or barley flour for example, or any mixture thereof depending on the nature of the final product. Rice flour is preferred as affording a fermented material having a neutral taste.

In addition to the above cereal flour there is also used, according to the invention, a non-cereal starch material such as potato starch or manioc starch. When subjected to the various treatments which are described here after, such non-cereal starch material provides the desired smoothness, thickness and stability of the fermented material.

Relative proportions of cereal flour and non-cereal starch material will greatly depend on the nature and quality of the final product to mix with. It is the task of the man in the art to select the most appropriate kinds of ingredients and their relative proportions to reach the desired effect: in most cases this can be done based on routine trials.

The gelatinization of the selected flour cereal and non-cereal starch material can be effected according to the conventional techniques, steam heating for example. Homogenization of the gelatinized mixture is preferably carried out using wet-milling devices.

According to the invention the homogenized starch and cereal material is then subjected to a fermentation making use of specific acidifying strains or mixture of strains, more particularly strains selected from various Lactobacillus species or Streptococcus thermophilus, or even Bifidobacterium species.

As Lactobacillus species useful in accordance with the invention one can use conveniently strains selected from L.

acidophilus, L. casei, L. plantarum, L. delbrueckii, L. brevis, L. pentosus, L. mesenteroides and L. bulgaricus.

If it is desired, mixtures of two distinct Lactobacillus species can also be used, for example L. plantarum and L. casei, or even two distinct subspecies of the same Lactobacillus species such as L. plantarum for example.

The fermentation can also be performed using one Lactobacillus species, L. casei for example, together with a non-Lactobacillus species, in that case preferably Streptococcus thermophilus or Bifidobacterium bifidus.

As different strains and mixtures of strains can behave differently when subjected to fermentation according to the invention, selection of same will be mainly directed on the impact they may have on the quality of the fermented material, either in terms of taste or thickness or viscosity for example.

Examples of strains or mixtures of strains which performed successfully in accordance with the present invention are described here below.

According to the present invention the fermentation process can be carried out following conventional techniques. It will be carried out over a period and within a temperature range suitable to keep the selected strains active and in such a way to achieve a well controlled pH value of the fermented material. Final pH of said fermented material is indeed one of the critical parameters of the composition of the invention depending on the final use which is intended for: spicy sauces or dairy spreads, for example.

Other parameters will also be controlled when considering for instance the physical aspect of the selected foodstuff. Thus, dry matter content, taste, smell or colour will further condition appropriate use of the fermented cereal based material.

Preferred compositions, for example useful for reducing the fat caloric content of products like mayonnaise or similar sauces or spreads are characterized as having a pH of about 3.5 to 4.0 and further characterized by a dry matter content of about 14 to 19 weight %, a total acidic content of about 0.21 to 0.42 weight % expressed as lactic acid content and a viscosity of about 3000 to 5000 cP (shear rate 87/ s. at 20° C.; Haake viscosimeter).

Other preferred compositions, for example useful for reducing the fat caloric content of sauces like hollandaise or bearnaise sauces are characterized as having a pH of about 4.0 to 4.2 and further characterized by a dry matter content of about 12 to 16 weight %, a total acidic content of about 0.32 to 0.37 and a consistency of about 5 to 10 cm/15 s at 20° C.

Considering reducing the fat caloric content of foodstuffs such as fresh cheeses or dairy spreads one can propose advantageously, as preferred composition, a cereal based fermented material having a pH of about 3.6 to 4.6 and further characterized by a dry matter content of about 11 to 15 weight %, a total acidic content of about 0.21 to 0.44 weight % expressed as a lactic acid content and a consistency of about 2 to 4 cm/15 s. at 20° C.

Surprisingly, it has been observed that the above fermented cereal material does not alter the taste and flavour of said food products. In particular it does not impart any "floury" or "cooked cereal" taste or like to said food products, even if present in significant proportions.

Again, it will be the task of the man in the art to determine more precisely the organoleptic quality as well as the proportions of fermented material to use to reduce the content of fats or oils in the selected foodstuffs and to what extent such reduction can be done to afford food products still acceptable for the consumers.

EXAMPLES

The following examples only represent an illustration of the present invention but in no way any restriction of same. Temperatures are given in degrees Celsius and percentages in weight percent.

Example 1

Preparation of a fermented material suitable for mayonnaise

A culture medium of a Lactobacillus strains was prepared using the following ingredients (parts by weight):

| a) Inoculum | |
|---|---|
| rice flour | 112 |
| manioc starch | 24 |
| wheat flour | 15 |
| sucrose | 7 |
| skimmed milk powder | 7 |
| yeast extract* | 7 |
| distilled water | 750 |

*(DIFCO-0881-01-3)

and subjecting the above mixture to sterilization at approx. 120° C. for 15 min.

After cooling the above culture medium was inoculated at a rate of 1% (weight) with the following strain:

Lactobacillus plantarum (FLORAPAN L-73 of C. Hansen's Laboratories)

and then incubated at 32° C. for approx. 9–12 hours up to achievement of the desired growth rate: $10^8$ to $10^9$ colony forming units per gram of inoculum; final pH 3.5.

b) Fermentation

The following ingredients were mixed in a container suitable for heat treatment (parts expressed in kilograms):

| rice flour | 96.6 |
|---|---|
| manioc starch | 21.3 |
| wheat flour | 12.7 |
| sucrose | 6.1 |
| skimmed milk powder | 6.1 |
| yeast extract | 6.1 |
| gelatine | 12.6 |
| xanthan gum | 4.4 |
| water | 757.0 |

The above mixture was then injected with steam up a temperature of 135° C. and further kept at that temperature for 2 min., then mechanically homogenized and finally cooled at approx. 32° C.

The resulting slurry was then transferred into a fermentation tank, then inoculated with the strain referred to here above, at a rate of 1.0% of liquid inoculum per weight of slurry.

The fermentation took place at 32° C. for 8 hours affording to an acidic amylaceous fermented material which was characterized as follows: pH 3.8; total acidic content 0.35% (expressed us lactic acid content/weight); dry matter content 16.7% weight; viscosity 4000 cP (measured at a shear rate of 87/ s. at 20° C. in a Haake viscosimeter)

It is a white paste with gel like and creamy texture which was further treated as provided hereafter, before final storage.

The following preservatives were added to the fermented material (parts by weight):

| | |
|---|---|
| sucrose | 1.50% |
| salt | 1.50% |
| acetic acid | 0.11% |
| potassium sorbate | 0.08 |

After mixing, the resulting material was pasteurized at 80° C. for 2 min. and finally cooled down to less than 20° C.

The pasteurized material proved quite stable after prolonged storage (up to 4 weeks at 25° C.).

Example 2

Preparation of a fermented material suitable for warm sauces a) Inoculum

A culture medium for a mixture of Lactobacillus and Streptococcus strains was prepared using the following ingredients (parts by weight):

| | |
|---|---|
| rice flour | 150 |
| skimmed milk powder | 70 |
| sucrose | 50 |
| calcium monophosphate | 2 |
| yeast extract* | 40 |
| alpha-amylase | 0.2 |
| distilled water | 100 |

*DIFCO 0127-01-7 and subjecting the above mixture to sterilization at approx. 120° C. for 15 min.

After cooling, separate portions of the above culture medium were inoculated at a rate of 1% (weight) with the strains defined here below:

| | |
|---|---|
| *Streptococcus thermophilus* (CNCM I-1383) | 0.5 |
| *Lactobacillus casei* (ATCC 393) | 1.0 | then incubated up to achievement of the desired growth rate: $10^8$ to $10^9$ colony forming units per gram of inoculum; final pH 4.4, and finally combined in a way to achieve the above relative proportions.

b) Fermentation

The following ingredients were mixed in a container suitable for heat treatment (parts expressed in kilograms):

| | |
|---|---|
| rice flour | 105 |
| manioc starch | 23 |
| wheat flour | 14 |
| sucrose | 6 |
| skimmed milk powder | 6 |
| yeast extract | 1 |
| water | 750 |

The above mixture was then injected with steam up to get a temperature of 135° C. and further kept at that temperature for 2 min., then mechanically homogenized and finally cooled down to approx. 35° C.

The resulting slurry was then transferred into a fermentation tank, then inoculated with the mixture of strains referred to here above, at a rate of 2.5% of liquid inoculum per weight of slurry, and further added with sodium citrate at a rate of 0.04% weight.

The fermentation took place at 35° C. for 8 hours affording to an acidic amylaceous fermented material which was characterized as follows: pH 4.0–4.2; total acidic content 0.32–0.37% (expressed as weight of lactic acid); dry matter content 14–15% (weight) and consistency of 8 cm/15 s. at 20° C. as defined hereafter. The thus afforded material is a white translucent past having a smooth structure.

"Consistency" measurement provides a characteristic value of this kind of material which may be compared to the flowing rate of the liquid or semi-liquid material. It consists of measuring the unidirectional horizontal movement of a sample of material per time unit, in the present case cm. per 15 s. period (at 20° C.).

Whenever suitable pasteurization of the fermented material can be applied at 65° C. for 2 min. The pasteurized material is then stored under 10° C. for a prolonged period.

Example 3

Preparation of a fermented material suitable for dairy spreads a) Inoculum

A culture medium for a mixture of Lactobacillus and Streptococcus strains was prepared using the following ingredients (parts by weight):

| | |
|---|---|
| rice flour | 112 |
| manioc starch | 24 |
| wheat flour | 15 |
| sucrose | 7 |
| skimmed milk powder | 7 |
| yeast extract* | 7 |
| distilled water | 750 |

*(DIFCO-0881-01-3)

the above mixture being first gelatinized by steam heating, then milled, cooled at room temperature and finally diluted such to have a dry matter content of about 10%.

Inoculation was effected separately with Lactobacillus strains defined hereafter according to the standard technique, at a rate of 1% (weight):

| | |
|---|---|
| *Lactobacillus plantarum* (ATCC 8041) | 0.5 |
| *Lactobacillus plantarum*** | 1.0 |
| *Lactobacillus casei* (ATCC 393) | 1.0 |

**FLORAPAN L-73 of C. Hansen's Laboratories and then incubated at 32° C. for 9 to 12 hours up to achievement of the desired growth rate: $10^8$ to $10^9$ colony forming units per gram of inoculum; final pH 3.5 to 4.1. The separate inoculums were finally combined in a way to achieve the above relative proportions.

b) Fermentation

The following ingredients were mixed in a container suitable for heat treatment (parts expressed in kilograms):

| | |
|---|---|
| rice flour | 88.3 |
| manioc starch | 19.2 |
| wheat flour | 11.5 |
| sucrose | 5.4 |
| skimmed milk powder | 5.4 |
| yeast extract | 1.4 |
| water | 78.7 |

The above mixture was then injected with steam up to get a temperature of 135° C. and further kept at that temperature for 2 min., then mechanically homogenized and finally cooled at approx. 32° C.

The resulting slurry was then transferred into a fermentation tank, then inoculated with the mixture of strains referred to here above, at a rate of 1.2% of liquid inoculum per weight of slurry, and further added with sodium citrate at a rate of 0.04% weight.

The fermentation took place at 32° C. for 8 hours to afford to an acidic amylaceous fermented material which was characterized as follows: pH 4.1; total acidic content 0.31% (expressed as weight of lactic acid); dry matter content 12% weight and consistency of 4 cm/15 s. at 20° C. as defined here above.

The fermented material is a white translucent paste having a smooth structure. It was then pasteurized at 85° C. for 2 min. and finally cooled down to less than 10° C. before using.

Example 4
Preparation of a "light mayonnaise"

The ingredients referred to hereafter were used according to the conventional techniques to afford the desired product.

| Ingredients | Weight percentage |
| --- | --- |
| Fermented material according to Example 1 | 57.80 |
| soy oil | 28.16 |
| pasteurized whole eggs | 10.75 |
| acetic acid (11%) | 1.16 |
| white mustard | 1.04 |
| sucrose | 0.48 |
| salt | 0.28 |
| mustard aroma | 0.15 |
| citric acid | 0.10 |
| potassium sorbate | 0.05 |
| food grade color | 0.01 |

Preparation: mixing fermented material with powdered ingredients and mustard. Adding pasteurized eggs and further emulsify for 30 s. Add oil and vinegar and emulsify for 90 s., then for 60 additional s. and fill suitable containers.

Example 5
Preparation of a cheese spread

The ingredients referred to hereafter were used according to the conventional techniques to afford the desired product.

| Ingredients | Weight percentage |
| --- | --- |
| Fermented material according to Example 3 | 49.740 |
| fresh white cheese | 22.291 |
| bonbell cheese | 11.146 |
| gruyère cheese | 11.146 |
| skimmed milk powder | 2.662 |
| butter (unsalted) | 0.998 |
| food grade melting salts | 1.598 |
| food grade colour | 0.004 |
| potassium sorbate | 0.001 |
| salt | 0.415 |

Preparation: putting all ingredients except fermented material in a container and heat then with direct steam injection, while stirring. Finally stir at high speed (3600 rpm) for 90 s. and keep under vacuum for 2 min. Adding fermented material to the previous mixture, then inject steam up to 85° C. and keep as is for 10 min. under moderate stirring. Cool down to 40° C. then keep under vacuum for 3 min. and put into suitable containers.

Example 6
Preparation of a "light butter" spread

The ingredients referred to hereafter were used according to the conventional techniques to afford the desired product.

| Ingredients | Weight percentage |
| --- | --- |
| Fermented material according to Example 3 | 49.935 |
| butter (unsalted) | 49.885 |
| food grade emulsifier | 0.100 |
| potassium sorbate | 0.050 |
| butter flavor | 0.030 |

Preparation: adding butter and cooled fermented material in a container, then the rest of ingredients and stir moderately for 5 min. while keeping cold. Then stir at 3600 rpm under vacuum for 3 min. and fill into suitable containers.

Example 7
Preparation of a sweet creamy spread

The ingredients referred to hereafter were used according to the conventional techniques to afford the desired product.

| Ingredients | Weight percentage |
| --- | --- |
| Fermented material according to Example 3 | 38.60 |
| sugar | 33.93 |
| skimmed milk powder | 11.86 |
| milk fat | 3.74 |
| food grade melting salt | 0.47 |
| vanillin | 250 ppm |
| water | 12.00 |

Preparation: mixing all ingredients, then sterilizing the mixture at 120° C. for 1 hour and finally cooling.

Example 8
Preparation of a "sauce hollandaise"

The ingredients referred to hereafter were used according to the conventional techniques to afford the desired product.

| Ingredients | Weight percentage |
| --- | --- |
| I) White Wine | 7.630 |
| onions, chopped (fresh) | 3.820 |
| black peppercorns (crushed) | 0.080 |
| chili powder | 0.040 |
| food grade | 0.001 |
| II) Egg yolk | 4.580 |
| butter, clarified | 19.089 |
| fermented material according to Example 2 | 63.610 |
| salt | 1.020 |
| potassium sorbate | 0.130 |

Preparation: reducing the mixture ingredients I to half of its volume and strain through a cheesecloth, then mix the reduction with the other ingredients at 50° C. Pasteurize at 85° C. and finally homogenize before filling suitable containers.

Example 9
Preparation of "petit suisse" fresh cheese/fruit spread

The ingredients referred to hereafter were used according to the conventional techniques to afford the desired product.

| Ingredients | Weight percentage |
| --- | --- |
| Fermented material according to Example 3 | 33.93 |
| quark (16.2% fat) | 38.00 |
| strawberry syrup 50° Brix | 11.86 |
| commercial cream (45% fat) | 3.74 |

Preparation: mixing the milk components with gentle stirring, then add the fermented material while stirring and finally add the strawberry syrup. Once homogenous fill into suitable containers and store refrigerated.

Information relating to microorganisms

1. Streptococcus thermophilus CNCM I-1383

Isolated from a fermented dairy product.

Morphology: diplococcus form, frequently grouped as small size chains, no tail. No spore formation observed—Gram positive microorganisms, catalase negative and factultatively anaerobic.

Fermentation of sugars: produces lactic acid from Dglucose, lactose and sucrose.

Exhibits texturizing properties through exopolysaccharides production.

Registered on Dec. 8, 1993 in accordance with the rules of the Budapest Convention under No. I-1383 at the Collection Nationale de Cultures de Microorganismes-Institut Pasteur-28, rue du Docteur Roux F-75724 Paris.

2. *Lactobacillus casei* ATCC 393

Disclosed as registration No. 393 on page 115 of the 1989 Catalog of the American Type Culture Collection 12301 Parklawn Drive-Rockville, Md. 20852-USA.

3. *Lactobacillus pentosus* ATCC 8041

Disclosed as registration No. 8041 on page 118 of the 1989 Catalog of the American Type Culture Collection 12301 Parklawn Drive-Rockville, Md. 20852-USA.

What is claimed is:

1. Process for reducing the fat caloric content of foodstuffs containing fats or oils, which comprises:

preparing an acidic amylaceous fermented composition by:

a) gelatinizing a slurry of a cereal flour and at least one additional non-cereal starch material, and homogenizing the gelatinized slurry;

b) inoculating the homogenized slurry with at least one acidifying strain selected from the group consisting of Lactobacillus species, *Streptococcus thermophilus* and Bifidobacterium species;

c) subjecting the inoculated slurry to a fermentation over a sufficient time period and at a sufficient temperature to afford a pH of about 3.5 to 4.2 to the fermented material; and d) stabilizing the fermented material to form the acidic amylaceous fermented composition; and preparing a foodstuff containing an amount of the acidic amylaceous fermented composition, wherein the foodstuff containing the fermented composition has a reduced fat caloric content compared to a foodstuff prepared without the fermented composition, and wherein the fermented composition has a neutral taste and the amount of fermented composition used does not impart a taste to the foodstuff and does not alter the taste of the foodstuff.

2. Process according to claim 1, wherein the cereal flour is rice flour, wheat flour, oat flour, barley flour or a mixture thereof.

3. Process according to claim 1, wherein the non cereal starch material is potato starch or manioc starch.

4. Process according to claim 1, wherein the Lactobacillus species are selected from *L. acidophilus, L. casei, L. plantarum, L. delbrueckii, L. brevis, L. pentosus, L. mesenteroides* and *L. bulgaricus*.

5. Process according to claim 4, wherein the at least one strain is a mixture of strains containing two distinct Lactobacillus species.

6. Process according to claim 4, wherein the at least one strain is a mixture of strains of two distinct subspecies of the same Lactobacillus species.

7. Process according to claim 1, wherein the at least one strain is a mixture of strains of at least one Lactobacillus species or subspecies and a non-Lactobacillus species.

8. Process according to claim 1, wherein homogenization of the gelatinized slurry is carried out by wet-milling.

9. Process according to claim 1, wherein the fermented material is stabilized by cooling, heating or sterilizing.

10. Process according to claim 1, further comprising pasteurizing the acidic amylaceous fermented composition.

11. Process according to claim 1, wherein the flour used to make the acidic amylaceous fermented composition is rice flour.

12. Process according to claim 1, wherein the amount of fermented composition in the foodstuff is about 34 to 64% by weight.

* * * * *